July 23, 1963 T. G. BROWN, JR 3,098,994

SELF CHECKING DIGITAL COMPUTER SYSTEM

Filed Oct. 26, 1956 3 Sheets-Sheet 1

Inventor
THOMAS G. BROWN, JR.
By Philip M. Bolton
Attorney

Inventor
THOMAS G. BROWN, JR
By Philip M. Bolton
Attorney

July 23, 1963 T. G. BROWN, JR 3,098,994

SELF CHECKING DIGITAL COMPUTER SYSTEM

Filed Oct. 26, 1956 3 Sheets-Sheet 3

Inventor
THOMAS G. BROWN, JR.
By Philip M. Bolton
Attorney 3,098,994

SELF CHECKING DIGITAL COMPUTER SYSTEM

Thomas G. Brown, Jr., Paramus, N.J., assignor to International Telephone and Telegraph Corporation, Nutley, N.J., a corporation of Maryland Filed Oct. 26, 1956, Ser. No. 618,556
5 Claims. (Cl. 340—146.1)

This invention relates generally to data processing systems and in particular to an electronic digital computer having a self-checking system.

Early in the development of digital computers a need was recognized for checking the accuracy of the machine operations. The ideal check system would be a system which checked every operation, but it is clear that such a system would not be economically feasible since it would in all probability require a duplicate of the computer.

In order to arrive at a reasonable check of the machine operations without duplicating the computer, the design trend has been toward verifying certain operations which are felt would be more susceptible to errors than other operations. It is now common practice to provide a check on the memory circuits since the error rate is relatively high in many memory circuits such as a magnetic drum or magnetic tape. The well-known parity check method as described in the text "Electronic Data Processing for Business and Industry" by Richard Canning, published by Wiley, has been very popular for checking memory circuits.

A second point of a digital computer which has a relatively high error rate is the arithmetic unit and hence it is desirable to check this component operation. Unfortunately, the parity check method is not well adapted for checking the arithmetic unit operation although there are other methods for checking the arithmetic unit operations. One of the original ways of performing this check was to calculate the problem in the arithmetic unit either simultaneously or by interchanging the factors. This method is still used in some computer systems but requires either two arithmetic units, to calculate simultaneously or enough storage space to store one problem answer while the problem is being recalculated with the interchanged factors. The amount of necessary equipment and in the latter method the added time to accomplish this type of checking is a serious limitation on this method. The well-known "casting out 9's" system which is also in the text supra is another method for checking arithmetic unit operations. The "casting out 9's" method has advantages when used to check an arithmetic unit operation because it will recognize an alteration of any digit in a number handled by the unit with little practical exception. The "casting out 9's" system, however, does have two limitations in that there are required four bit positions to represent the check number since the check number may be any number from 0 to 8 and, secondly, considerable amounts of equipment are necessary to handle the generation and mathematic manipulation of the check numbers in order to make the system effective.

It is therefore an object of this invention to provide an improved digital computer self-checking system.

It is a further object of this invention to provide a digital computer self-checking system which will require relatively few bit positions for a check number and relatively little equipment for handling the check numbers.

It is a further object of this invention to provide a digital computer self-checking system which can perform a check on an arithmetic unit operation.

In carrying out the above objects, this invention features the necessary circuitry to provide a remainder-modulo-three check system which is a check system wherein every character, can be assigned a check number according to the following procedure: divide the magnitude of the character by 3. If the character is positive use the remainder as the check number, however if the character is negative subtract the remainder from 3 and use the difference as the check number. By using a remainder-modulo-three check system the merits of the "cast out 9's" system are preserved in that the check method will determine an error which results from an alteration of any bit with little practical exception, while requiring less equipment for the operation than would a "casting out 9's" operation. The check number in the remainder-modulo-three system can only be a 0, 1 or 2 and since these numbers can be represented respectively by 00, 01, and 10, the check numbers can have a ternary value but be in a binary form which is the language of this computer system. Because of the small number of possible check numbers, the check number arithmetic unit is arranged to combine the check numbers according to a predetermined pattern which is not truly an addition, subtraction or multiplication but which represents these respective operations and yields a proper check number for each operation. The mathematical principles which serve as a basis for "modulo M" operations, of which remainder-modulo-three is an example, can be found on pages 17 through 22 of the text "Higher Algebra" by Marie Weiss, published by Wiley & Sons, 1949. If the associated characters are being respectively either added, subtracted, or multiplied then because the check numbers can be handled simply according to the predetermined pattern, the equipment necessary to effect the check on the arithmetic unit operation is reduced. If a digit were to be altered by the value 3, or a multiple of 3, this system would not recognize the alteration just as the "cast out 9's" system will not recognize a digit change of 9 to 0 or 0 to 9. Another aspect of this limitation lies in the fact that a code, wherein a weight of 3 or a multiple of 3 has been assigned, cannot be used with this system. From a practical standpoint this non-determination is not a limitation because such codes are rarely used and therefore an alteration when using any of the other weighted codes would change the value of the bit by a power of 2 in straight binary or by a power of 2 times 10 in binary coded decimal and therefore the error would be recognized.

The above objects and features of this invention and other features and objects thereof will become more apparent by reference to the following description taken in conjunction with the accompanying drawings of a excess —3 binary coded parallel-serial system embodying the invention in which.

Figure 1:
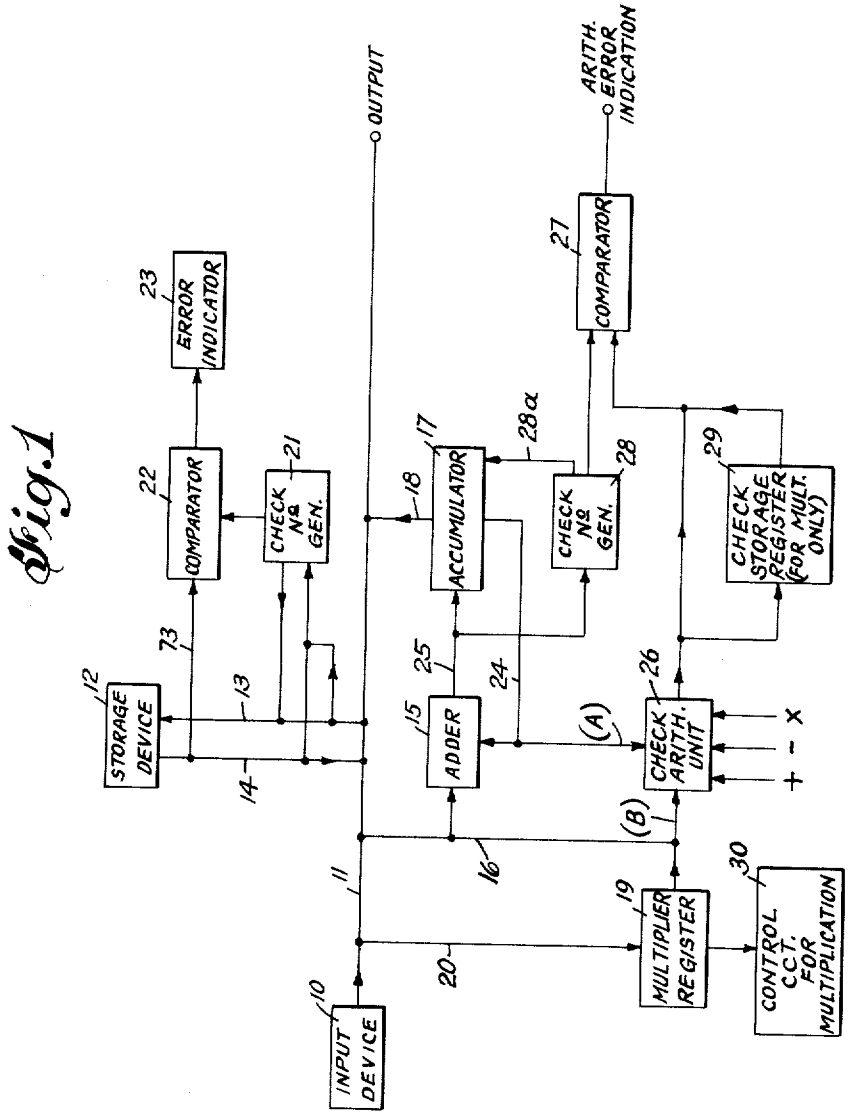
FIG. 1 is a block diagram of a portion of a computer system.

In FIG. 1 a character source is shown at 10 which may be any well-known input such as a magnetic tape, paper tape, punch cards et al. There is a common channel 11 connected to the character source 10. To common channel 11 there is connected the storage device 12 by means of the storage device write-in channel 13 and read-out channel 14; the adder device 15 by means of the adder channel 16; the accumulator device 17 by means of the read-out channel 18; the multiplier register device 19 by means of the read-in channel 20. Shunted across channel 13 is a check number generator device 21 which is in turn coupled to a check number comparator 22 and an error indicator 23. The accumulator device 17 is coupled to the adder device 15 by read-out channel 24 and write-in channel 25. Shunted across channel 24, channel 16 and the multiplier register 19 is a check number arithmetic unit 26. The output of check number arithmetic unit 26 is coupled to a comparator 27 which is in turn coupled to a check number generator 28. Check number generator 28 is coupled to the accumulator 17 by means of channel 28*a*. A check number storage register 29 is shunted across the output of the check number arithmetic unit 26 and the comparator unit 27. The control circuits for multiplication 30 are shown coupled to the multiplier register 19.

Figure 2:
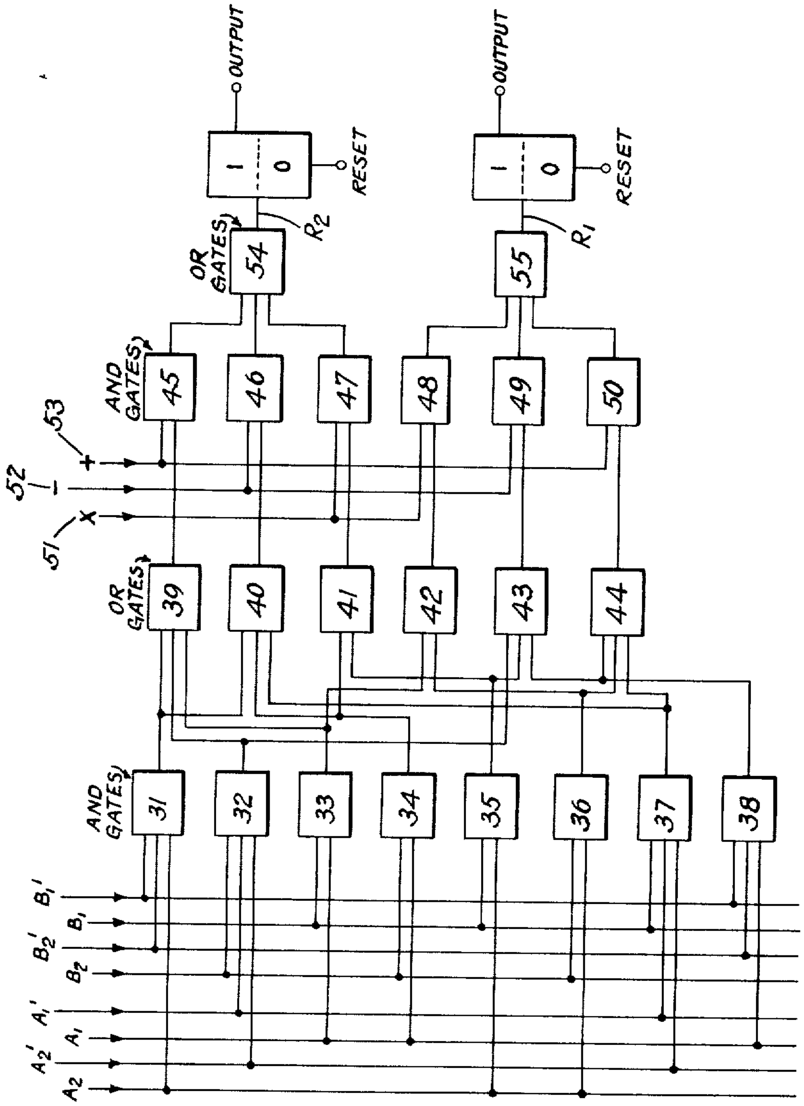
FIG. 2 is a schematic drawing of the check number arithmetic unit.

In FIG. 2 the check number arithmetic unit 26 of FIG. 1 is shown in schematic form. The lines $A_2$ through $A_1'$ of FIG. 2 are shown as A on FIG. 1 and the lines $B_2$ through $B_1'$ of FIG. 2 are shown as B on FIG. 1. The lines $A_2$ through $B_1'$ are coupled in a parallel arrangement to the inputs of a plurality of "and" gates 31 through 38. The "and" gates outputs are in turn coupled to the inputs of the "or" gates 39 through 44. The "or" gates outputs are in turn coupled to the inputs of the "and" gates 45 through 50. Three instruction inputs 51 through 53 are also connected to the inputs of the "and" gates 45 through 50. The outputs of the "and" gates 45 through 50 are coupled to the inputs of the "or" gates 54 and 55.

Figure 3:
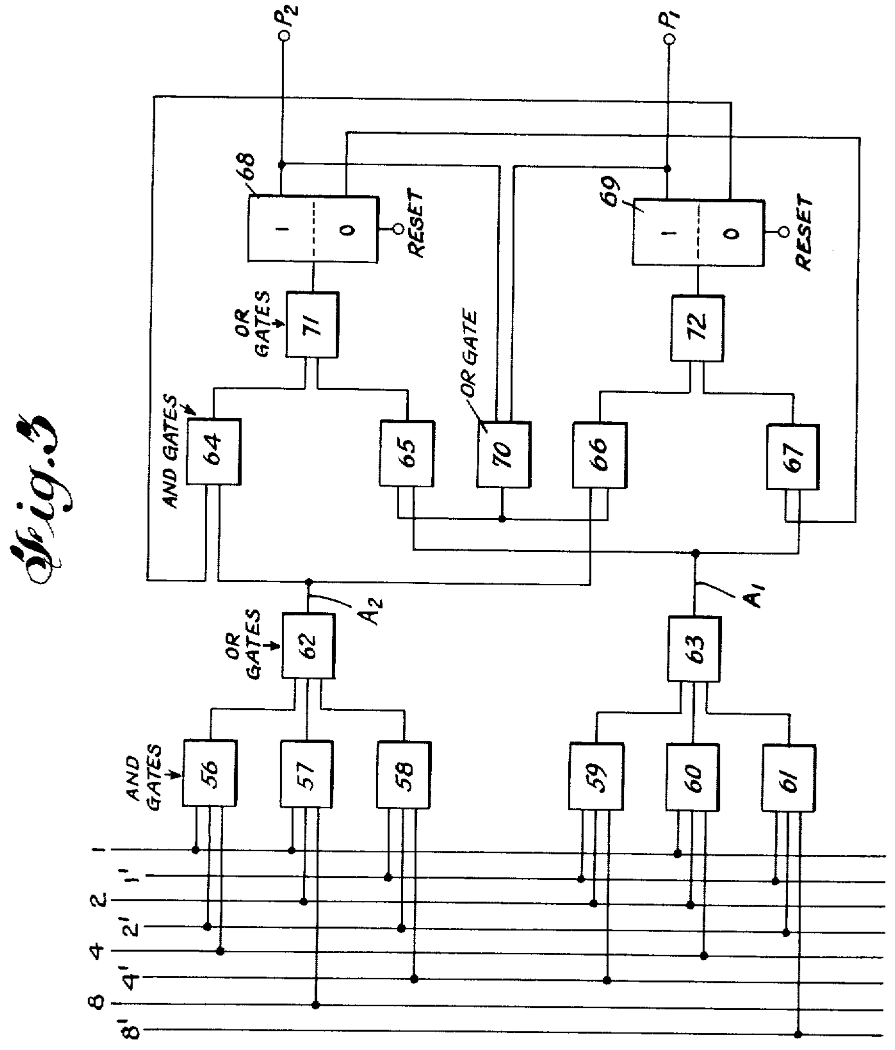
FIG. 3 is a schematic drawing of the check number generator.

In FIG. 3 there is shown a check number generator in schematic form which is represented at 21 and 28 in FIG. 1. The lines 8' through 1 are repeatedly represented in FIG. 1 by channels 13, 14, and 25. The "and" gates 56 through 61 have their inputs coupled in a parallel arrangement to the lines 8 through 1. The outputs of the "and" gates 56 through 61 are coupled to the inputs of the "or" gates 62 and 63. The outputs of the "or" gates 62 and 63 are coupled to the inputs of the "and" gates 64 through 67. Lines $P_1$ and $P_2$ represent respectively one output from each of the bistable devices 68 and 69. Lines $P_1$ and $P_2$ are also coupled to the "or" gate 70 whose output is coupled to the "and" gate inputs 65 and 66. The upper inputs of the "and" gates 64 and 67 are coupled to the bistable devices 69 and 68 respectively. The outputs of the "and" gates 64 through 67 are coupled to the inputs of the "or" gates 71 and 72 whose outputs in turn are coupled to the bistable devices 68 and 69 respectively. The operation of the invention will become more comprehensive with the following discussion.

In the operation of digital computer certain functions are basic. As described in the article "Computing Bit by Bit" by A. L. Samuel, "Proceedings of the IRE," October 1953, on page 1225, two of the functions that are basic to any computer are information switching and information storage. A third basic operation to computer devices is the provision of a source of clock pulses operating in conjunction with some type of programing means such as a "program ring" described on pages 322 and 323 of the text "Arithmetic Operations in Digital Computers" by R. K. Richards, published by Van Nostrand, 1955. In the three text references the "Proceedings of the IRE," October 1953, the text book "Pulse and Digital Circuit" by Millman and Taub, published by McGraw-Hill, August 1956, and the above-mentioned text by Richards there are numerous references and examples to switching circuits, storage devices and control pulse or clock pulse means operating in conjunction with programing devices. FIG. 1 of this disclosure merely represents a portion of a computer. For purposes of simplicity, and since such structure or devices to accomplish these basic functions are well known as described in the texts above, the detailed descriptions of the switching operations, memory devices and the control circuitry were not included in FIG. 1.

Let us in FIG. 1 assume that at the channel source 10 there is fed to the machine a character K having a value 257 and a character Q having a value 446 and let us further assume that these two characters are to be added and checked in the computer. Character K passes along the common channel 11 and through proper machine conditioning is passed through channel 13 to the storage device at 12. As character K passes along channel 13 there is generated in the check number generator at 21 a check number 2 which represents the number 257 or character K. The method by which this check number is generated can best be understood by examining FIG. 3 in conjunction with FIG. 1. As described above lines 8' through 1 on FIG. 3 are represented by the channel 13 in FIG. 1. Let us consider the character K whose value is 257 as passing along on the lines 8 through 1 in FIG. 3. For purposes of illustration, FIG. 3 shows the check number generator being operative with a system using an excess three code wherein the digits are presented as follows:

*Table I*

| Number: | Excess 3 code |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

It follows from Table I that the number 7 which passes into the machine first chronologically will be represented by 1010 which would cause the lines 8, 4', 2 and 1' to be "up." Examining FIG. 3 it becomes apparent that the "and" gate 59 is opened and hence line $A_1$ is "up" through the "or" gate 63. Assuming the bistable devices are in the condition 00 prior to the write-in of the 7 then one side of the "and" gate 67 and one side of the "and" gate 64 are conditioned. With $A_1$ being "up," it is clear that "and" gate 67 is opened and through "or" gate 72 the bistable device 69 is flipped to the "one" side resulting in the check number 01 being generated. As described above the possible check numbers in the remainder-modulo-three system 0, 1, and 2 are represented in the computer in binary form by respectively 00, 01, and 10. A partial table of the remainder-modulo-three check numbers is as follows:

*Table II*

| Character | Check |
|---|---|
| . | . |
| −2 | 1 |
| −1 | 2 |
| 0 | 0 |
| 1 | 1 |
| 2 | 2 |
| 3 | 0 |
| 4 | 1 |
| 5 | 2 |
| 6 | 0 |
| 7 | 1 |
| . | . |

It can be seen from the table that the check number for a 7 is 1 and since a 1 according to our discussion is represented by a 01, we have now generated the proper check number by flipping the bistable device 69. Continuing we find the number 5 which is the tens position of our character K entering the machine. Examining Table I we find the number 5 will be represented by 1000. Further examining FIG. 3 we find that the lines 8, 4', 2', and 1' will be "up" and that this state will cause "and" gate 58 to open. With "and" gate 58 open, line $A_2$ is "up" and partially conditions "and" gates 64 and 66. The bistable devices were left in a 01 condition as a result of generating the check number for 7. With bistable device 69 in the "one" condition, the "and" gates 66 and 65 are partially conditioned through "or" gate 70. "And" gate 66 having been conditioned completely now opens and bistable device 69 is flipped back to the 0 condition. Since the machine is a synchronous machine, the operation initiated by the character 5 goes no further and there results in the check number generator an 00 condition. 00 is the check number for a word having two characters whose respective check numbers are 1 and 2. The table for "addition" of check numbers according to the predetermined pattern discussed above is as follows:

*Table III*

| Check Number | Resultant Check Number |
|---|---|
| 0+0=0 | |
| 0+1=1 | |
| 0+2=2 | |
| 1+1=2 | |
| 1+2=0 | |
| 2+2=1 | |

It follows that the check number for 7 from Table II is 1 and the check number for 5 is 2. According to Table III, then 1+2=0 and since we have generated an 00 condition, our check number for 57 is correct. The circuitry in the check number generator provides for resetting after each word so that the check number for the word is generated from an original 00 condition. The term "word" as used in this disclosure is as defined in the September 1956, issue of the "Proceedings of the IRE" on page 1173, according to the IRE standards. The check number for a 2, which is the hundreds position of character K from Table II, is a 2 and the check number is generated as were the check numbers for 7 and 5 as described above. Adding a check number 2 to the check number 0 representing 57, which is standing in the generator, we have according to Table III the following, 0+2=2 so that the resultant check number for 257 or character K is 2. Without following through the circuitry again we can determine from Table II and Table III that the check number for the character Q whose value we assumed would be 446 is 1+1+0 which "adds" to 2. It is clear then that the problem of adding 257+446 can be checked as follows:

| Character | Check Number | Resultant Check Number |
|---|---|---|
| 257 | 2+2+1 = | 2 |
| +446 | 1+1+0 = | + |
| | | 2 |
| 703=1+0+0 | = | 1✓ 1✓ |

The check numbers are generated and utilized immediately following the processing of the respective characters to which they correspond and apply, so that the check numbers will trail behind their respective characters if transfers are made from one part of the computer to another.

We have considered how to generate the check number for each of the characters K and Q. These check numbers are passed from the check generator 21 through channel 13 to the storage device 12 where they are stored with their associated characters K and Q. The storage device 12 can be any one of the many computer storage devices described in the "Proceedings of the IRE," October 1953. Let us assume we are now going to add character K and character Q. The character K is readout of the storage device 12 and passed along the readout channel 14, the common channel 11, and since character K is the first character in the operation it is inserted into the accumulator 17 by switching means not shown in FIG. 1 and which were omitted for the purpose of clarity of FIG. 1 as described above. As the character K passes along channel 14, a check number is generated in a manner identical to the manner described above in connection with the passage of character K along channel 13 into the storage device 12. The check number stored with the character K is also passed along channel 14 and is read by means of channel 73 into the comparator 22 where it is compared with a second check number which is generated as the character is readout. The acceptance of the check number into the comparator 22 can be accomplished through many forms of computer logic circuitry, for instance, in a serial machine where the words have been defined as 20 bits, a counter may count the bits during the storage readout and during the 21st bit count, a gating device can be conditioned to pass the information to the comparator 22. The checking system at this point thus provides a check of the check number stored in the device 12 against a check number generated by the check number generator 21 for a character being readout from the device 12. A non-coincidence of the check numbers causes the error indicator at 23 to become operative. The error indicator device and comparator can be any coincidence circuit such as an "and" gate described in the text by Millman and Taub, mentioned above, having an output coupled, for instance, to a neon light. Having assumed that the character K was inserted in the accumulator 17 accompanied by its associated check number, let us now follow the readout of character Q and the addition of the two characters. Character Q passes along channel 14 and the check number is checked as was done for character K. Character Q further passes along channel 11 and along channel 16 to the adder device 15. As the character Q passes along channel 16 with its associated check number trailing behind the check number is read off and passed to the check number arithmetic unit 26. Simultaneously with reading out of the stored character Q, the character K is passed from the accumulator 17 along channel 24 to the adder 15 and in a like fashion the check number associated with character K is read off and passed along the A line to the check number arithmetic unit 26. As character K and character Q are added at the adder device 15 their associated check numbers are also "added" according to a predetermined pattern in the check number arithmetic unit at 26. The "addition" of the check numbers can be better understood by considering FIG. 2 in connection with FIG. 1. As mentioned above, the B lines and the A lines in FIG. 2 are represented in FIG. 1 as A and B. Let us follow the check number for character Q (character Q having a value of 446) which is a 2 and represented in binary as 10, as it passes along the A line. In FIG. 2, the check number 10 would cause the lines $A_2$ and $A_1'$ to be "up." Likewise the check number for character K (whose value is 257) is 2 and represented by 10 and would cause the lines $B_2$ and $B_1'$ to be "up." Examining FIG. 2 it is obvious that with lines $A_2$, $A_1'$, $B_2$ and $B_1'$ "up" the "and" gate 36 is opened and through "or" gates 42 and 44 the "and" gates 48 and 50 are respectively partially conditioned. Since this operation is an addition, the instruction line 53 is "up" and hence "and" gate 50 is opened so that $R_1$ is conditioned to cause a bistable device associated therewith to flip to "one" position. $R_1$ and $R_2$ are reset to the zero condition prior to handling an "addition." The instruction lines 51 and 52 make it possible for the check number arithmetic unit to handle "subtraction" and "multiplication" according to a predetermined pattern shown by the Tables IV and V. Following similar steps, the circuitry can be followed through and need not be so considered here.

*Table IV*

SUBTRACTION

0—0=0
0—1=2
0—2=1
1—0=1
1—1=0
1—2=2
2—0=2
2—1=1
2—2=0

*Table V*

MULTIPLICATION

0×0=0
0×1=0
0×2=0
1×1=1
1×2=2
2×2=1

By way of illustration two problems can be solved and checked as follows:

| Character | Check Number | Character | Check Number |
|---|---|---|---|
| 446<br>−257<br>——<br>189<br>1+2+0=0 | 2<br>−2<br>0√<br>0√ | 446<br>×257<br>——<br>114622<br>1+1+1+0+2+2=1 | 2<br>×2<br>1√<br>1√ |

Returning now to the check number for the result of the addition operation of character K and character Q in FIG. 1, we find this check number is passed from the generator at 26 to the comparator at 27. As the sum of the addition of character K and character Q is passed to the accumulator along channel 25 a new check number is generated at 28 identically as described before. The new check number is passed from the check number generator 28 to the comparator 27 to be compared, thus checking the addition operation and the check number is also passed to the accumulator device 17 by means of channel 28*a* to be stored for future use with the sum in the accumulator 17. Since the check number for a multiplication operation is determined immediately from the multiplier and the multiplicand and since the actual multiplication operation may take time, the check number is passed from the check number arithmetic unit at 26 to the check number storage register 29 to await the end of the multiplication operation at which time the stored check number from 29 is compared with the check number generated from the product as the product passes along 25 to the accumulator 17.

While I have described above the principles of my invention in connection with specific apparatus, it is to be clearly understood that this description is made only by way of example and not as a limitation to the scope of my invention as set forth in the objects thereof and in the accompanying claims.

I claim:

1. A remainder modulo-*n* checking system comprising first and second sources of binary coded signal combinations having respective first and second corresponding numerical values belonging to the group of remainder integers modulo-*n*, where *n* is an integer not less than 2, $2^n-1$ coincidence switching means coupled to said first and second sources and having $2^{n-1}$ corresponding output channels uniquely selectable in accordance with the $2^n-1$ possible combinations of said first and second values selected from said group, absent the combination consisting of coincident first and second values of zero (modulo-*n*), $n-1$ pluralities of switching circuits including $n-1$ bistable circuits, reset means for conditioning said $n-1$ bistable circuits to first stable conditions, and first, second, and third control means for applying control signals to said $n-1$ pluralities of circuits to couple the selected ones of said coincidence switching means to reverse the states of predetermined ones of said bistable circuits in accordance with respective tables of multiplication, subtraction, and addition (modulo-*n*).

2. A remainder modulo-3 checking system comprising first and second sources of binary coded signal combinations representing respective first and second numerical values belonging to the group of remainder integers modulo-3, 8 coincidence switching means coupled to said first and second sources for selectively channeling the eight possible combinations of outputs therefrom absent the combination consisting of signals representing first and second values of zero (modulo-3), first and second pluralities of switching circuits each including a bistable circuit having associated first and second output conditions of stability, reset means for establishing said bistable circuits simultaneously in said first condition of stability and first, second, and third means for applying control signals to selectively condition said first and second pluralities of switching circuits to selectively transfer signals from the selected one of said coincidence switching means to said bistable circuits to establish said bistable circuits in said second condition of stability in accordance with respective tables of multiplication, subtraction, and addition (modulo-3).

3. A system for generating a check number corresponding to the remainder modulo-*n* of the sum of a series of numbers comprising a source of first signal combinations having associated numerical values, conversion means coupled to said source, and responsive to said first combinations, other than those having an associated numerical value equal to zero, or an integral multiple of the number *n*, to produce corresponding second signal combinations having associated numerical values equal to the remainder modulo-*n* of said values of said corresponding first combinations, and accumulating means coupled to said conversion means to accumulate a representation of the remainder modulo-*n* of the sum of said numerical values associated with said second combinations.

4. A system for generating a check number corresponding to the remainder modulo-3 of the sum of a series of numbers, comprising a source of first signal combinations representing successive decimal digits, conversion means coupled to said source and responsive to said first combinations, other than those having an associated value equal to zero or, a multiple of the integer 3, to produce corresponding second signal combinations having associated values equal to the remainder modulo-3 of said values of said corresponding first combinations, and means coupled to said conversion means for accumulating the remainder modulo-3 of the sums of said values associated with said second combinations.

5. A remainder modulo-*n* checking system comprising sources of first and second binary signals representative of respective first and second decimal numbers, first and second means coupled respectively to said first and second sources for producing binary signals representative of the sum (modulo-*n*) of the digits of said respective first and second decimal numbers, third means coupled to said first and second means for marking one of $2^n-1$ output lines in accordance with the combined output conditions of said first and second means, absent that combination associated with simultaneous values of zero (modulo-*n*), and a plurality of switching circuits coupled to said third means for operating on the marking signal produced at the output thereof in accordance with a selected one of three arithmetic operations.

References Cited in the file of this patent

UNITED STATES PATENTS

| | | |
|---|---|---|
| 2,425,549 | Luhn | Aug. 12, 1947 |
| 2,634,052 | Bloch | Apr. 7, 1953 |
| 2,653,996 | Wright | Sept. 29, 1953 |
| 2,674,727 | Spielberg | Apr. 6, 1954 |
| 2,700,755 | Burkhart | Jan. 25, 1955 |
| 2,719,959 | Hobbs | Oct. 4, 1955 |
| 2,776,091 | Chenus | Jan. 1, 1957 |
| 2,790,600 | Dersch | Apr. 30, 1957 |
| 2,826,359 | Deerhake et al. | Mar. 11, 1958 |
| 2,837,278 | Schreiner et al. | June 3, 1958 |
| 2,919,854 | Singman | Jan. 5, 1960 |

OTHER REFERENCES

Publication: "Faster, Faster" by Eckert et al., chapter 8, pp. 98–104, copyright 1955.

Richards: Arithmetic Operations in Digital Computers, D. Van Nostrand Co., Inc., Princeton, New Jersey, copyright February 1955, pp. 299, 300.